(12) United States Patent
Hiranuma et al.

(10) Patent No.: US 8,136,348 B2
(45) Date of Patent: Mar. 20, 2012

(54) EXHAUST PURIFICATION APPARATUS FOR ENGINE

(75) Inventors: Satoshi Hiranuma, Kawasaki (JP);
Minehiro Murata, Kawasaki (JP);
Yoshinaka Takeda, Kawasaki (JP);
Hiroaki Fujita, Kawasaki (JP); Satoshi Yamazaki, Kawasaki (JP); Shinichi Saito, Kawasaki (JP); Yasuko Suzuki, Kawasaki (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 625 days.

(21) Appl. No.: 12/251,135

(22) Filed: Oct. 14, 2008

(65) Prior Publication Data
US 2009/0100825 A1   Apr. 23, 2009

(30) Foreign Application Priority Data
Oct. 17, 2007   (JP) .................. 2007-270187

(51) Int. Cl.
*F01N 3/00* (2006.01)
(52) U.S. Cl. .......................... 60/295; 60/286
(58) Field of Classification Search .............. 60/286, 60/295
See application file for complete search history.

(56) References Cited

U.S. PATENT DOCUMENTS

| | | | |
|---|---|---|---|
| 5,628,186 A | 5/1997 | Schmelz | |
| 2005/0235632 A1 | 10/2005 | Tarabulski et al. | |
| 2008/0022658 A1* | 1/2008 | Viola et al. | 60/286 |
| 2008/0271440 A1 | 11/2008 | Xu et al. | |

FOREIGN PATENT DOCUMENTS

| | | |
|---|---|---|
| DE | 43 15 278 A1 | 11/1994 |
| DE | 10 2005 041 660 A1 | 3/2007 |
| DE | 10 2008 018 063 A1 | 11/2008 |
| JP | 2003-222019 A | 8/2003 |
| JP | 2005-273503 A | 10/2005 |
| JP | 2006-057575 A | 3/2006 |
| JP | 2007-162487 A | 6/2007 |
| JP | 2007-162488 A | 6/2007 |
| JP | 2008-163856 A | 7/2008 |

OTHER PUBLICATIONS

Related co-pending U.S. Appl. No. 12/246,706, filed Oct. 7, 2008; specification, claims and abstract, pp. 1-29; drawings, Figs 1-13.
First Office Action issued in corresponding German Patent Application No. 10 2008 050 356.8 dated Jun. 1, 2010.
Office Action issued in corresponding Chinese Patent Application No. 200810171511.4 dated Jul. 5, 2010.

* cited by examiner

*Primary Examiner* — Kenneth Bomberg
*Assistant Examiner* — Abdul Elnoubi
(74) *Attorney, Agent, or Firm* — Rossi, Kimms & McDowell LLP

(57) ABSTRACT

An exhaust purification apparatus comprises an ammonia selective reduction-type NOx catalyst that selectively reduces NOx within exhaust gas by using ammonia as a reducing agent, a urea-water supply device that supplies urea-water into the exhaust gas existing upstream of the ammonia selective reduction-type NOx catalyst, and a control unit. The control unit controls the urea-water supply device so that the urea-water is intermittently supplied according to predetermined supply duration time and predetermined supply suspension time when the urea-water is supplied from the urea-water supply device for the purpose of providing ammonia to the ammonia selective reduction-type NOx catalyst.

5 Claims, 3 Drawing Sheets

EXHAUST PURIFICATION APPARATUS FOR ENGINE

BACKGROUND OF THE INVENTION

1. Field of the Invention

The present invention relates to an exhaust purification apparatus for purifying the exhaust gas of an engine, and more specifically, to an exhaust purification apparatus having an ammonia selective reduction-type NOx catalyst that reduces NOx contained in exhaust gas by using ammonia as a reducing agent, which is produced from the urea-water supplied into the exhaust gas.

2. Description of the Related Art

A conventionally-known exhaust purification apparatus purifies exhaust gas by removing NOx (nitrogen oxides) that is one of pollutants contained in the exhaust gas of an engine. This exhaust purification apparatus includes an ammonia selective reduction-type NOx catalyst (hereinafter, referred to as an SCR catalyst) that is interposed in the exhaust passage of the engine. The SCR catalyst is supplied with ammonia working as a reducing agent. The exhaust gas is purified by reducing NOx with the aid of the ammonia.

In general, such an exhaust purification apparatus supplies urea-water, which is easier than ammonia to use, into the exhaust gas for the purpose of providing ammonia to the SCR catalyst. The urea-water is injected into the exhaust gas by using a urea-water injector or the like. The atomized urea-water that has been supplied from the urea-water injector into the exhaust gas is hydrolyzed by exhaust gas heat. The ammonia produced as a result of the hydrolyzation is supplied to the SCR catalyst. The SCR catalyst adsorb the ammonia supplied to the SCR catalyst, and the SCR catalyst promotes denitrifying reaction between the ammonia and the NOx contained in the exhaust gas. The NOx is thus reduced, and the exhaust gas is purified.

In this process, a portion of the atomized urea-water that has been injected from the urea-water injector is liquefied by colliding with the inner walls of the exhaust passage or other places, and adheres to the exhaust passage, the urea-water injector, etc. The adherent urea-water becomes a solid such as urea crystal (hereinafter, referred to as solid urea) when the moisture contained in the urea-water is vaporized. The solid urea is accumulated on the inner walls of the exhaust passage and the urea-water injector. Due to the vaporization latent heat that is produced during the vaporization of the moisture contained in the adherent urea-water, cold spots are created in places to which the urea-water has adhered. For this reason, more atomized urea-water is prone to be liquefied and adhere to the places to which the urea-water has adhered and the surrounding areas of these places. This encourages the formation of the solid urea.

Such a continuous accumulation of the solid urea might increase exhaust flow resistance in the exhaust passage and block the exhaust passage. Moreover, there is a possibility of causing an operational trouble of the urea-water injector. Unexamined Japanese Patent Publication No. 2005-273503 (hereinafter, referred to as Document 1) suggests an exhaust purification apparatus that removes the solid urea accumulated on a urea-water injector by intermittently injecting the urea-water from the urea-water injector in order to solve the above-mentioned problems. The exhaust purification apparatus described in Document 1 performs the intermittent urea-water injection from the urea-water injector. Consequently, the solid urea accumulated on the urea-water injector is dissolved or blown away and then removed from the urea-water injector.

The exhaust purification apparatus of Document 1, however, removes the solid urea by the intermittent injection when the SCR catalyst has temperature lower than activation temperature, that is, when the SCR catalyst does not need an ammonia supply. The urea-water used for the removal of the solid urea therefore does not contribute to the exhaust purification of the SCR catalyst, so that extra urea-water is consumed.

Furthermore, the exhaust purification apparatus of Document 1 is capable of removing the solid urea accumulated on the urea-water injector by urea-water injection but not removing the solid urea accumulated in the exhaust passage. There causes another problem that the urea-water injected for the removal of the solid urea is liquefied and adheres to the walls of the exhaust passage, which promotes the solid urea accumulation on the walls of the exhaust passage.

SUMMARY OF THE INVENTION

An aspect of the present invention is directed to an exhaust purification apparatus for an engine, comprising: an ammonia selective reduction-type NOx catalyst interposed in an exhaust passage of an engine for selectively reducing NOx contained in exhaust gas by using ammonia as a reducing agent; urea-water supply means for supplying urea-water into exhaust gas existing upstream of the ammonia selective reduction-type NOx catalyst; and control means for controlling the urea-water supply means so that the urea-water is intermittently supplied according to predetermined supply duration time and predetermined supply suspension time when the urea-water is supplied from the urea-water supply means for the purpose of providing ammonia to the ammonia selective reduction-type NOx catalyst.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

One embodiment of the present invention will be described below with reference to the attached drawings.

Figure 1:
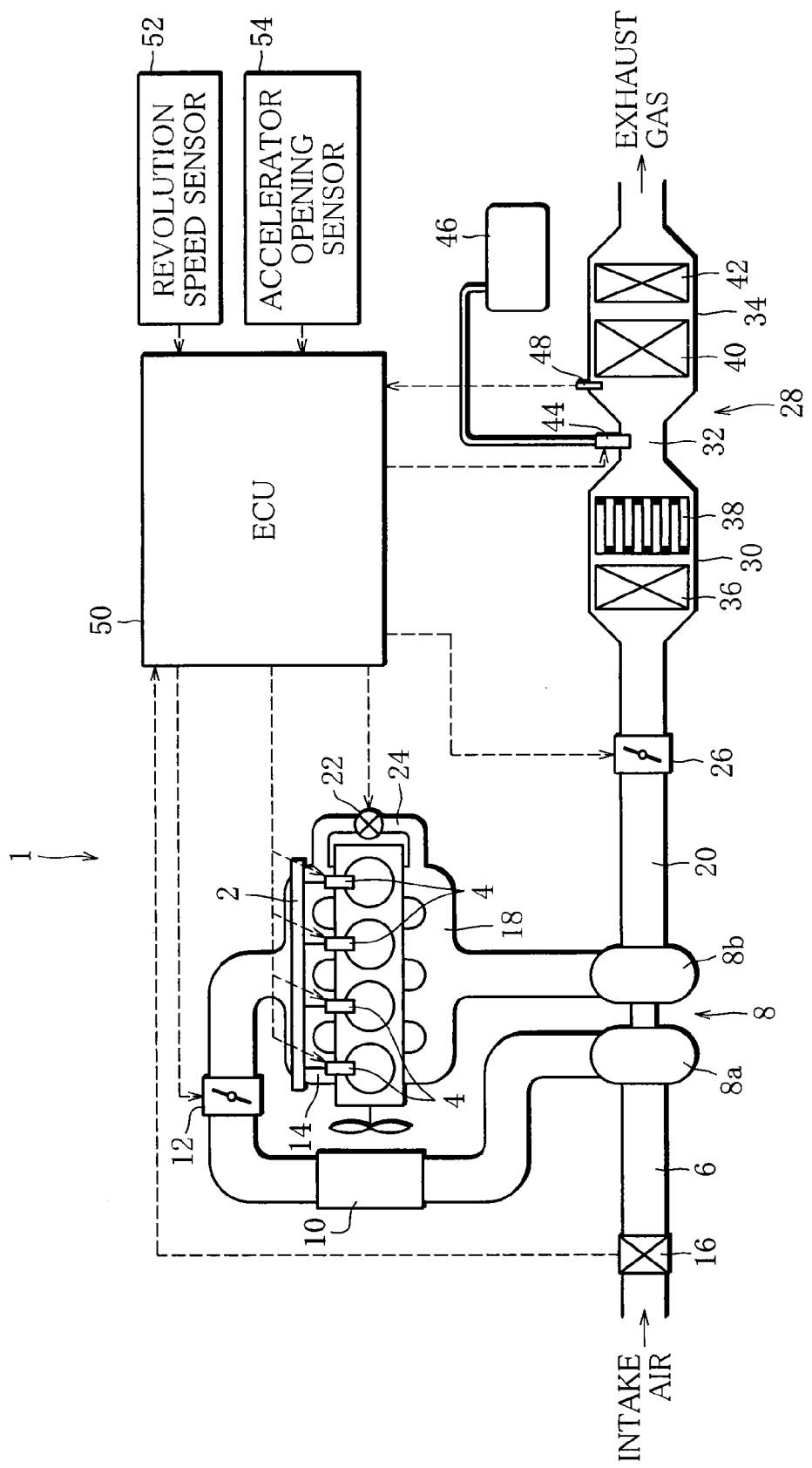
FIG. 1 is a view showing an entire configuration of an engine system to which an exhaust purification apparatus according to one embodiment of the present invention is applied.

FIG. 1 is a view showing an entire configuration of an engine system including a four-cylinder diesel engine (hereinafter, referred to as engine) 1, to which an exhaust purification apparatus according to the embodiment of the present invention is applied. Referring to FIG. 1, the configuration of the engine system will be explained in detail.

The engine 1 has a high-pressure accumulator (hereinafter, referred to as common rail) 2 that is provided commonly to cylinders. High-pressure fuel that is supplied from a fuel-injection pump, not shown, and stored in the common rail 2 is supplied to fuel injectors 4 provided to the cylinders. The high-pressure fuel is subsequently injected from the fuel injectors 4 into the respective cylinders.

A turbocharger 8 is mounted to an intake passage 6. Intake air that is sucked in from an air cleaner, not shown, flows from the intake passage 6 into a compressor 8a of the turbocharger 8. The intake air that is turbo-charged by the compressor 8a is introduced into an intake manifold 14 through an intercooler 10 and an intake control valve 12. An intake air flow sensor 16 for detecting a flow rate of the intake air sucked into the engine 1 is interposed in the intake passage 6 to be located upstream from the compressor 8a.

Exhaust ports, not shown, through which exhaust gas is discharged from the cylinders of the engine 1, are connected to an exhaust pipe 20 through an exhaust manifold 18. Disposed between the exhaust manifold 18 and the intake manifold 14 is an EGR passage 24 that connects the exhaust manifold 18 and the intake manifold 14 to each other with an EGR valve 22 interposed therebetween.

A turbine 8b of the turbocharger 8 is interposed in the exhaust pipe 20, and is connected to an exhaust after-treatment device 28 through an exhaust throttle valve 26 that is set downstream of the turbine 8b. The turbine 8b has a rotary shaft that is mechanically coupled to a rotary shaft of the compressor 8a. The turbine 8b that has received the exhaust gas flowing through the exhaust pipe 20 drives the compressor 8a.

The exhaust after-treatment device 28 includes an upstream casing 30 and a downstream casing 34 that is connected to the downstream side of the upstream casing 30 through a communication passage 32. The upstream casing 30, the communication passage 32, and the downstream casing 34 construct an exhaust passage of the present invention together with the exhaust pipe 20.

The upstream casing 30 accommodates a pre-stage oxidizing catalyst 36 and a particulate filter (hereinafter, referred to as filter) 38 that is placed downstream of the pre-stage oxidizing catalyst 36. The filter 38 traps particulates contained in the exhaust gas and thus purifies the exhaust gas of the engine 1.

The pre-stage oxidizing catalyst 36 oxidizes NO (nitrogen monoxide) contained in the exhaust gas to produce $NO_2$ (carbon dioxide). Since the pre-stage oxidizing catalyst 36 is located upstream of the filter 38, the $NO_2$ produced in the pre-stage oxidizing catalyst 36 flows into the filter 38. The particulates trapped and accumulated in the filter 38 are oxidized in reaction with the $NO_2$ supplied from the pre-stage oxidizing catalyst 36. In result, a continuous regeneration of the filter 38 is carried out.

The downstream casing 34 accommodates an ammonia selective reduction-type NOx catalyst (hereinafter, referred to as an SCR catalyst) 40 that adsorbs ammonia contained in the exhaust gas and uses the ammonia as a reducing agent to selectively reduce the NOx (nitrogen oxides) contained in the exhaust gas to purify the exhaust gas. In the downstream of the SCR catalyst 40 within the downstream casing 34, there is disposed a post-stage oxidizing catalyst 42 for removing from the exhaust gas the ammonia that has flown out of the SCR catalyst 40. The post-stage oxidizing catalyst 42 has a function of oxidizing CO (carbon monoxide) produced when the particulates are burnt in forced regeneration of the filter 38, and then discharging $CO_2$ (carbon dioxide) that is produced by oxidizing CO.

In the communication passage 32, there is interposed a urea-water injector (urea-water supply means) 44 that injects urea-water into the exhaust gas existing in the communication passage 32. The urea-water injector 44 is supplied with the urea-water through a urea-water supply pump, not shown, from a urea-water tank 46 in which the urea-water is stored. The supplied urea-water is injected from the urea-water injector 44 into the exhaust gas within the communication passage 32 in response to the opening and closing of the urea-water injector 44.

The atomized urea-water that has been injected from the urea-water injector 44 is hydrolyzed by exhaust gas heat, which produces ammonia. The produced ammonia is supplied to the SCR catalyst 40 together with the exhaust gas. The SCR catalyst 40 adsorbs the supplied ammonia and promotes denitrifying reaction between the ammonia and the NOx contained in the exhaust gas. In result, the NOx contained in the exhaust gas is reduced and converted into harmless $N_2$ and the like. If the ammonia does not react with the NOx and flows out of the SCR catalyst 40, the ammonia is removed from the exhaust gas by the post-stage oxidizing catalyst 42.

An exhaust temperature sensor (exhaust temperature detection means) 48 for detecting exhaust temperature is set in the downstream casing 34 to be located upstream of the SCR catalyst 40. The exhaust temperature sensor 48 detects the temperature of the exhaust gas flowing into the SCR catalyst 40.

An ECU (control means) 50 is a control device for performing comprehensive control including the operation control of the engine 1. The ECU 50 is formed of a CPU, memory devices, timer-counters, etc. The ECU 50 calculates various control amounts and controls various devices according to the calculated control amounts.

In addition to the intake air flow sensor 16 and the exhaust temperature sensor 48, other various sensors, including a revolution speed sensor 52 for detecting the revolution speed of the engine 1, an accelerator opening sensor 54 for detecting a depression amount of an accelerator pedal, not shown, etc., are connected to an input side of the ECU 50 for the purpose of collecting information necessary for the various controls.

Connected to an output side of the ECU 50 are various devices including the fuel injectors 4 of the cylinders, the intake control valve 12, the EGR valve 22, the exhaust throttle valve 26, the urea-water injector 44, etc., which are controlled according to the calculated control amounts.

The ECU 50 also carries out the calculation of a fuel supply amount to the cylinders of the engine 1 and fuel supply control for controlling the fuel injectors 4 according to the calculated fuel supply amount. The fuel supply amount (main injection amount) required for the operation of the engine 1 is read out from a prestored map on the basis of the revolution speed of the engine 1, which has been detected by the revolution speed sensor 52, and the accelerator opening that has been detected by the accelerator opening sensor 54. The amount of the fuel supplied to each cylinder is adjusted according to a valve opening duration of the corresponding fuel injector 4. The ECU 50 opens each of the fuel injectors 4 over an operation period corresponding to the determined fuel amount, to thereby perform the main injection of fuel into the corresponding cylinder. This enables to supply the fuel in the required amount for the operation of the engine 1.

Besides the above-mentioned fuel supply control, the ECU 50 carries out the forced regeneration of the filter 38 and the urea-water supply control for providing ammonia to the SCR catalyst 40. The forced regeneration of the filter 38 has already been well-known, and a detailed description thereof will be omitted. The urea-water supply control implemented by the ECU 50 will be described below in detail.

The ECU 50 obtains an exhaust-gas discharge amount from the engine 1 per unit time and a NOx-discharge amount from the engine 1 per unit time on the basis of the fuel supply amount of the main injection from the injectors 4, the revolution speed of the engine 1, which has been detected by the revolution speed sensor 52, the flow rate of the intake air sucked into the engine 1, which has been detected by the intake air flow sensor 16, etc. The ECU 50 further obtains a target supply amount of the urea-water from the ammonia amount required for the NOx selective reduction of the SCR catalyst 40 with respect to the obtained NOx-discharge amount. The ECU 50 controls the urea-water injector 44 according to the target supply amount and makes the urea-water injector 44 supply the urea-water into the exhaust gas existing in the upstream of the SCR catalyst 40.

As stated above, the atomized urea-water that has been injected from the urea-water injector 44 is hydrolyzed by exhaust heat, and ammonia is thus produced. The produced ammonia is supplied to the SCR catalyst 40 together with the exhaust gas. The SCR catalyst 40 adsorbs the supplied ammonia and promotes the denitrifying reaction between the ammonia and the NOx contained in the exhaust gas. In result, the NOx is reduced and converted into harmless $N_2$ and the like.

Figure 2:
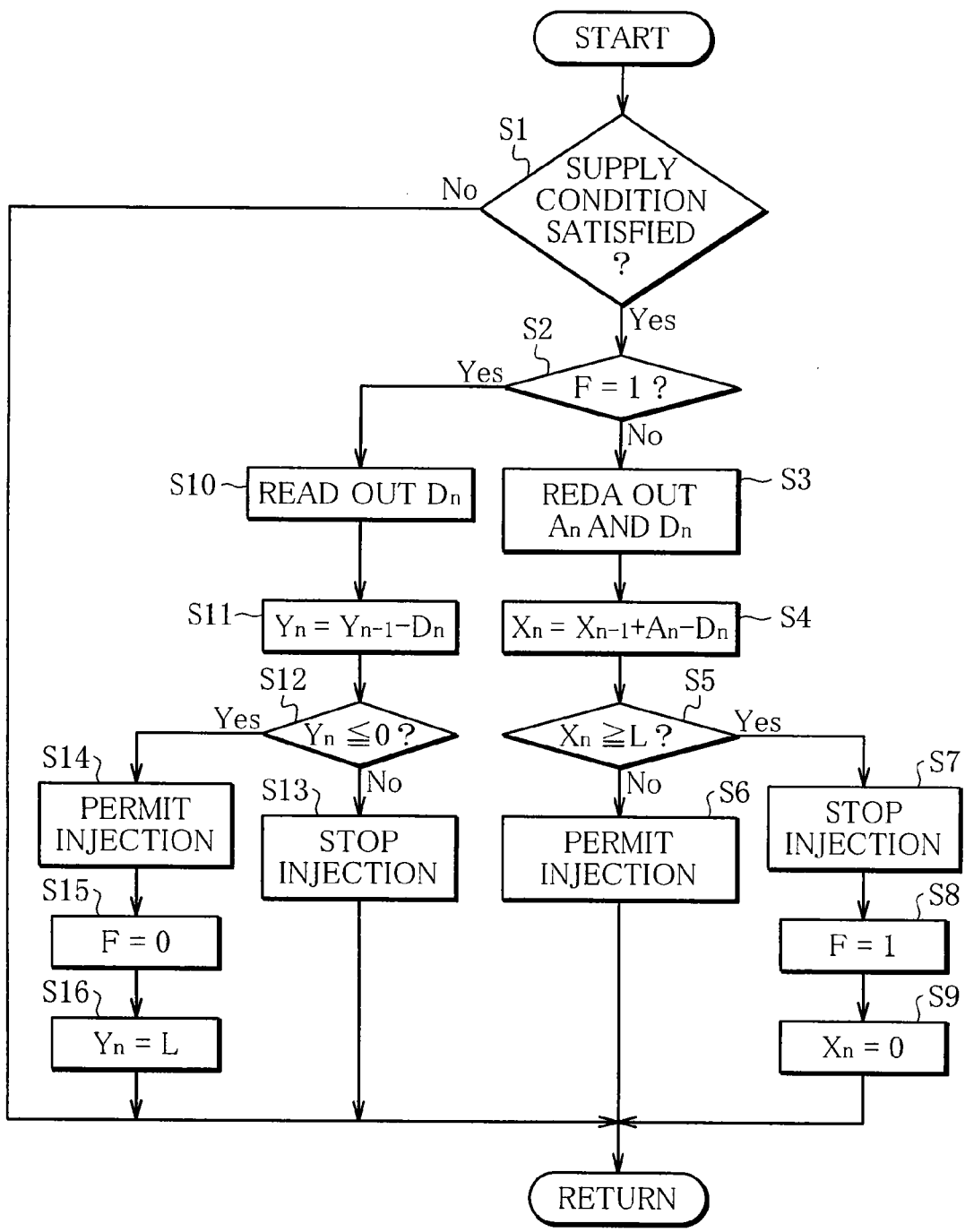
FIG. 2 is a flowchart of urea-water supply control that is implemented by ECU.

In order to properly perform the urea-water supply using the urea-water injector 44, the ECU 50 implements the urea-water supply control in predetermined control cycles according to the flowchart shown in FIG. 2. The urea-water supply control is started along with the start of the engine 1 and is finished in response to the stop of the engine 1.

Once the control is started, the ECU 50 determines, in Step S1, whether the ammonia supply to the SCR catalyst 40 is required on the basis of a judgment as to whether a condition for the urea-water supply is satisfied. More specifically, the ECU 50 makes a determination as to whether the SCR catalyst 40 is activated, on the basis of the exhaust temperature of the engine 1, which has been detected by the exhaust temperature sensor 48. When the exhaust temperature of the engine 1 becomes equal to or higher than a predetermined reference temperature based upon an activation temperature of the SCR catalyst 40, the ECU 50 determines that the SCR catalyst 40 is activated, and then that the condition for the urea-water supply is satisfied. In short, the ECU 50 determines from the activation of the SCR catalyst 40 that ammonia has to be provided to the SCR catalyst 40.

If the ECU 50 determines in Step S1 that the condition for the urea-water supply is satisfied, the ECU 50 advances the procedure to Step S2. If the ECU 50 determines in Step S1 that the condition for the urea-water supply is not satisfied, the ECU 50 ends a current control cycle, and in Step S1 of the subsequent control cycle, the ECU 50 again determines whether the condition for the urea-water supply is satisfied. Only if the ECU 50 determines in Step S1 that the condition for the urea-water supply is satisfied, and only if the ammonia supply to the SCR catalyst 40 is required, the ECU 50 advances the procedure to Step S2. In short, the urea-water supply control is implemented in respect of the urea-water supply for providing the ammonia to the SCR catalyst 40. The following explanation is provided on the premise that the condition for the urea-water supply is satisfied, and that the ECU 50 moves the procedure from Step S1 to Step S2.

In Step S2, the ECU 50 determines whether a value of a flag F is 1. The flag F indicates whether the urea-water supply from the urea-water injector 44 should be stopped. If the value of the flag F is zero, it indicates a permit for the urea-water supply. If the value of the flag F is 1, it indicates the suspension of the urea-water supply. An initial value of the flag F is set to zero. At the beginning of the urea-water supply control, the urea-water supply is permitted when the condition for the urea-water supply is satisfied.

If the ECU 50 determines in Step S2 that the value of the flag F is not 1, and advances the procedure to Step S3, the ECU 50 reads out an additional value $A_n$ and a subtraction value $D_n$ used in the current control cycle from prestored additional and subtraction value maps, respectively. A subscript "n" indicates that an additional or subtraction value belongs to the current control cycle. A subscript "n–1" is accordingly indicative of a previous control cycle.

The additional value map used to read out the additional value $A_n$ defines the additional value $A_n$ that is changed according to a supply amount ratio of the urea-water supplied from the urea-water injector 44 per unit time to an exhaust-gas discharge amount from the engine 1 per unit time, namely, a urea-water supply amount/exhaust-gas discharge amount ratio, and the temperature of the exhaust gas into which the urea-water is supplied.

The additional value $A_n$ corresponds to a formation amount of solids per unit time, including a urea crystal, which are formed from the urea-water supplied into the exhaust gas, (hereinafter, the solids are collectively referred to as solid urea). As the amount of the urea-water supplied into the exhaust gas is increased, the solid urea is more likely to be formed. The smaller the exhaust-gas discharge amount from the engine 1 is, the more likely the solid urea is formed. The lower the exhaust temperature is, the more likely the solid urea is formed. The ratio of the urea-water supply amount per unit time to the exhaust-gas discharge amount per unit time is proportional to urea-water density within the exhaust gas. In other words, the higher the urea-water density within the exhaust gas is, the more likely the solid urea is formed.

Figure 3:
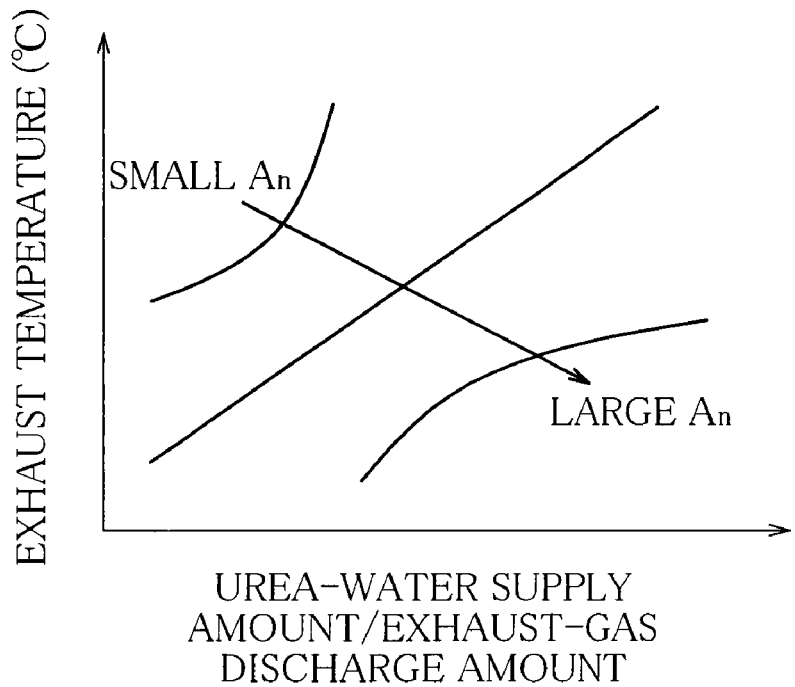
FIG. 3 is a graph showing a relationship of an additional value, exhaust temperature, and the ratio of a urea-water supply amount to an exhaust-gas discharge amount in an additional value map that is used in the urea-water supply control.

In the additional value map, as shown in FIG. 3, the additional value $A_n$ is set so as to be increased along with the increase of the ratio of the urea-water supply amount to the exhaust-gas discharge amount and along with the decrease of the exhaust temperature. According to the present embodiment, the additional value map is a three-dimensional map in which the additional value $A_n$ is determined by the urea-water supply amount/exhaust-gas discharge amount ratio and the exhaust temperature. The additional value map, however, may be a four-dimensional map in which the additional value $A_n$ is determined by the urea-water supply amount, the exhaust-gas discharge amount and the exhaust temperature. A relationship between each parameter and the additional value $A_n$ is similar to the relationship shown in the additional value map of the present embodiment.

The subtraction value map used to read out the subtraction value $D_n$ defines the subtraction value $D_n$ that is changed according to the exhaust-gas discharge amount from the engine 1 per unit time and the temperature of the exhaust gas into which the urea-water is supplied.

Figure 4:
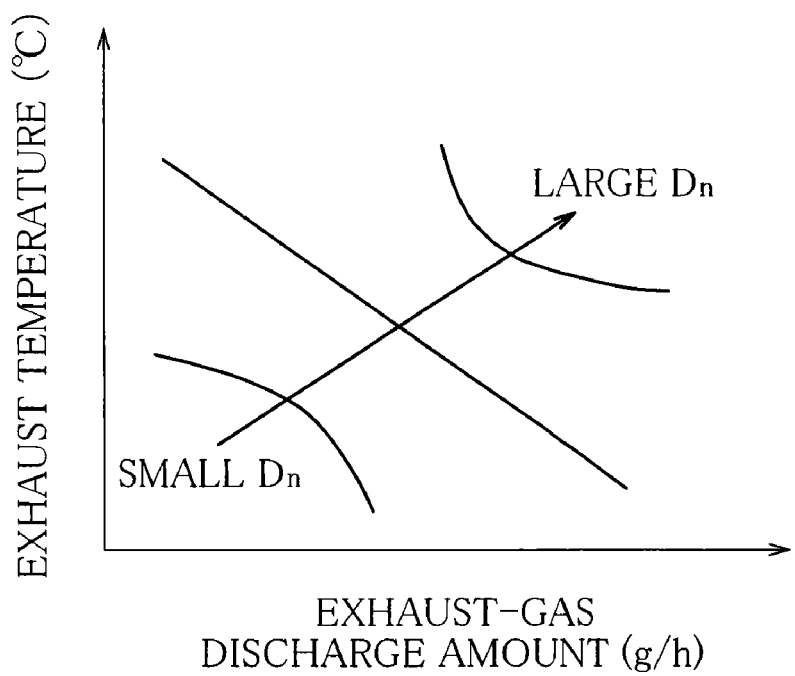
FIG. 4 is a graph showing a relationship of a subtraction value, exhaust temperature and an exhaust-gas discharge amount in a subtraction value map that is used in the urea-water supply control.

The subtraction value $D_n$ corresponds to an annihilation amount of the solid urea per unit time, which is an amount of the solid urea that is converted into ammonia in the exhaust gas to be annihilated. The larger the exhaust-gas discharge amount from the engine 1 is, the more likely the solid urea is converted to ammonia to be annihilated. Also, the higher the exhaust temperature is, the more likely the solid urea is converted to ammonia to be annihilated. In the subtraction value map, as shown in FIG. 4, the subtraction value $D_n$ is determined so as to be increased along with the increase of the exhaust-gas discharge amount and along with the increase of the exhaust temperature.

In Step S3, according to the exhaust temperature detected by the exhaust temperature sensor 48 in the current control cycle, and the target urea-water supply amount and the exhaust-gas discharge amount from the engine 1, which have been calculated by the ECU 50, the ECU 50 reads out the corresponding additional value $A_n$ from the additional value map. At the same time, according to the exhaust temperature and the exhaust-gas discharge amount, the ECU 50 reads out the corresponding subtraction value $D_n$ from the subtraction map.

In the subsequent Step S4, the ECU 50 calculates a first judgment value $X_n$ by using the additional value $A_n$ and the subtraction value $D_n$, which have been read out in Step S3. More specifically, the ECU 50 obtains the current first judgment value $X_n$ by adding the additional value $A_n$ to and subtracting the subtraction value $D_n$ from a first judgment value $X_{n-1}$ calculated by the ECU 50 in the previous control cycle. An initial value of the first judgment value $X_{n-1}$ is a preset lower limit value, which is zero in the present embodiment. If the ECU 50 moves the procedure from Step S2 to Step S3 and then to Step S4 for the first time after the determination in Step S1 changed from "No" to "Yes" or after the determination in Step S2 changed from "Yes" to "No", a value obtained by subtracting the subtraction value $D_n$ from the additional value $A_n$ is the current first judgment value $X_n$.

The current first judgment value $X_n$ is thus obtained, and the ECU 50 advances the procedure to Step S5. In Step S5, the ECU 50 makes a determination as to whether the current first judgment value $X_n$ obtained in Step S4 becomes equal to or larger than a predetermined upper limit value L, that is, whether the current first judgment value $X_n$ reaches the upper limit value L. If it is determined that the current first judgment value $X_n$ has not reached the upper limit value L, the ECU 50 advances the procedure to Step S6 and permits the urea-water injection. In result, the urea-water injection from the urea-water injector 44 is continuously carried out.

When the current control cycle is finished, and the subsequent control cycle begins, the ECU 50 starts the procedure from Step S1 again and advances the procedure to Step S2.

Since the value of the flag F is still zero, the ECU 50 moves the procedure from Step S2 to Step S3, and then to Step S4. In Step S4, as mentioned above, the ECU 50 calculates the current first judgment value $X_n$ by using the additional value $A_n$ and the subtraction value $D_n$ that have been read out in Step S3 and the first judgment value $X_{n-1}$ that has been calculated in the previous control cycle. In Step S4, the ECU 50 calculates the current first judgment value $X_n$ in each control cycle by using the additional value $A_n$, the subtraction value $D_n$, and the first judgment value $X_{n-1}$ that has been calculated in the previous control cycle as described above, and the first judgment value $X_n$ is thus updated.

If the ratio of the urea-water supply amount to the exhaust-gas discharge amount is relatively low or if the temperature of the exhaust gas into which the urea-water is supplied is relatively low, the solid urea is easily formed. In these cases, accordingly, the additional value $A_n$ is relatively large. If the exhaust-gas discharge amount is relatively small or if the temperature of the exhaust gas into which the urea-water is supplied is relatively low, the solid urea is difficult to convert to ammonia, and the annihilation amount of the solid urea is decreased. In such cases, accordingly, the subtraction value $D_n$ is relatively small. As the subtraction value $D_n$ becomes small in relation to the additional value $A_n$, the first judgment value $X_n$ that is repeatedly calculated in the control cycles in Step S4 is gradually increased.

If the first judgment value $X_n$ calculated in Step S4 is increased, and the ECU 50 determines in Step S5 that the first judgment value $X_n$ reaches the upper limit value L, the ECU 50 advances the procedure to Step S7, which stops the urea-water injection from the urea-water injector 44. The ECU 50 then advances the procedure to Step S8.

The ECU 50 sets the value of the flag F to 1 in Step S8, and advances the procedure to Step S9. In Step S9, the ECU 50 resets the current first judgment value $X_n$, which is an initial value of the first judgment value $X_{n-1}$ when the procedure moves to Step S4 in or after the subsequent control cycle, at a lower limit value zero. The ECU 50 then ends the current control cycle.

If the additional value $A_n$ and the subtraction value $D_n$ are increased or decreased according to the urea-water supply amount, the exhaust-gas discharge amount and the exhaust temperature, and as a result, the first judgment value $X_n$ reaches the upper limit value L, the ECU 50 stops the urea-water injection from the urea-water injector 44, which has been continuously carried out until then. A urea-water supply duration time up to a point when the supply is stopped in this manner is determined not only by the upper limit value L but also by the additional value $A_n$ and the subtraction value $D_n$ which are read out from the additional value map and the subtraction value map, respectively.

A relationship between the additional value $A_n$ and each parameter in the additional value map and a relationship between the subtraction value $D_n$ and each parameter in the subtraction value map are as described above. The upper limit value L, the additional value $A_n$ and the subtraction value $D_n$ are set at such values that the first judgment value $X_n$ reaches the upper limit value L during the urea-water injection, immediately before the solid urea starts to be accumulated, and the urea-water supply is stopped. There are various methods for setting the upper limit value L, the additional value $A_n$ and the subtraction value $D_n$. One example of those methods will be described later.

After the ECU 50 determines in Step S5 that the first judgment value $X_n$ reaches the upper limit value L, and the control cycle is finished by carrying out Steps S7 to S9 in the above-described manner, the ECU 50 moves the procedure from Step S1 and Step S2 in the subsequent control cycle. Since the value of the flag F is 1 at this point of time, the ECU 50 advances the procedure to Step S10.

In Step S10, the ECU 50 reads out from the subtraction value map the subtraction value $D_n$ to be used in the current control cycle. The subtraction value map defines the subtraction value $D_n$ that is changed according to the exhaust-gas discharge amount from the engine 1 per unit time and the temperature of the exhaust gas into which the urea-water is supplied. As shown in FIG. 4, the subtraction value $D_n$ is set so as to be increased along with the increase of the exhaust-gas discharge amount and along with the increase of the exhaust temperature. According to the exhaust temperature detected by the exhaust temperature sensor 48 in the current control cycle and the exhaust-gas discharge amount from the engine 1, which has been calculated by the ECU 50, the ECU 50 reads out the corresponding subtraction value $D_n$ from the subtraction value map.

In the subsequent Step S11, a second judgment value $Y_n$ is calculated using the subtraction value $D_n$ that has been read out in Step S10. More specifically, the ECU 50 obtains the current second judgment value $Y_n$ by subtracting the subtraction value $D_n$ that has been read out in Step S10 from a second judgment value $Y_{n-1}$ calculated by the ECU 50 in a previous control cycle. An initial value of the second judgment value $Y_{n-1}$ is an upper limit value L that is used in the Step S5. If the procedure moves from Step S2 to Step S10 and advances to Step S11 for the first time after the judgment of Step S2 is changed from "No" to "Yes", a value obtained by subtracting the subtraction value $D_n$ from the upper limit value L is the current second judgment value $Y_n$.

The current second judgment value $Y_n$ is thus obtained, and the ECU 50 advances the procedure to Step S12. In Step S12, the ECU 50 makes a determination as to whether the current second judgment value $Y_n$ obtained in Step S11 becomes equal to or higher than a predetermined lower limit value zero that is an initial value of the first judgment value $X_{n-1}$, that is, whether the current second judgment value $Y_n$ is decreased to the lower limit value zero. If it is determined that the current second judgment value $Y_n$ has not reached the lower limit value zero, the ECU 50 advances the procedure to Step S13 and sets the urea-water injection to be stopped. In result, the urea-water injection from the urea-water injector 44 is continuously suspended.

After the current control cycle is finished, in the subsequent control cycle, the ECU 50 starts the procedure from Step S1 again and advances the procedure to Step S2.

Since the value of the flag F is still 1, the ECU 50 moves the procedure from Step S2 to Step S10, and then to Step S11. In Step S11, the ECU 50 calculates the current second judgment value $Y_n$ by using the subtraction value $D_n$ that has been read out in Step S10 and the second judgment value $Y_{n-1}$ that has been calculated in the previous control cycle. In Step S11, the ECU 50 calculates the current second judgment value $Y_n$ in each control cycle by using the subtraction value $D_n$ and the second judgment value $Y_{n-1}$ that has been calculated in the previous control cycle as described above, and the second judgment value $Y_n$ is thus updated. Since the current second judgment value $Y_n$ is thus updated, the second judgment value $Y_n$ is gradually decreased.

If the second judgment value $Y_n$ calculated in Step S11 is decreased and the ECU 50 determines in Step 12 that the second judgment value $Y_n$ reaches the lower limit value zero, the ECU 50 advances the procedure to Step S14. In Step S14, the ECU 50 permits the urea-water injection from the urea-water injector 44 and advances the procedure to Step S15.

The ECU 50 sets the value of the flag F to zero in Step S15 and advances the procedure to Step S16. In Step S16, the ECU 50 resets the current second judgment value $Y_n$, which is an initial value of the second judgment value $Y_{n-1}$ when the procedure moves to Step S11 in or after the subsequent control cycle, at the upper limit value L. The ECU 50 then ends the current control cycle.

When the second judgment value $Y_n$ reaches the lower limit value zero, the ECU 50 restarts the urea-water injection from the urea-water injector 44, which has continuously been suspended. A urea-water supply suspension time up to a point when the supply is restarted in this manner is determined by the upper limit value L and the subtraction value $D_n$ that is read out from the subtraction value map.

The subtraction value $D_n$ in the subtraction value map is changed according to the exhaust-gas discharge amount from the engine 1 per unit time and the temperature of the exhaust gas to which the urea-water is supplied. The upper limit value L and the subtraction value $D_n$ affect the duration time of the urea-water supply from the urea-water injector 44. The upper limit value L and the subtraction value $D_n$ are set at such values that the second judgment value $Y_n$ reaches the lower limit value zero, and the urea-water supply is restarted, when the solid urea formed during the continuous urea-water supply is converted to ammonia to be annihilated while the urea-water supply is continuously suspended.

There are various methods for setting the upper limit value L and the subtraction value $D_n$ as well as the additional value $A_n$ used for the calculation of the first judgment value $X_n$. The following is one example of those methods.

In a first step, the engine 1 is preliminarily operated in a predetermined reference operational status by way of experiment. This step then finds, as a reference supply duration time, time that takes till the solid urea formed from the urea-water starts to be accumulated in the case where the urea-water is continuously supplied from the urea-water injector 44 into the exhaust gas during the above operation in the predetermined reference operational status. A subsequent step operates the engine 1 in the reference operational status, and finds, as reference supply suspension time, time that takes till the solid urea formed in the case where the urea-water is continuously supplied for the reference supply duration time, is converted to ammonia and annihilated after the urea-water supply is stopped. The upper limit value L and the subtraction value $D_n$ in the reference operational status are determined so that, when the second judgment value $Y_n$ is calculated in the above-mentioned manner, the second judgment value $Y_n$ reaches the lower limit value zero in the reference supply suspension time. On the basis of the upper limit value L and the subtraction value $D_n$ in the reference operational status which are determined as described above, the additional value $A_n$ in the reference operational status is determined so that, when the first judgment value $X_n$ is calculated in the above-described manner, the first judgment value $X_n$ reaches the upper limit value L in the reference supply duration time.

A next step finds a reference supply duration time and a reference supply suspension time in the case where the operational status of the engine 1 is varied variously from the reference operational status. The additional value $A_n$ and the subtraction value $D_n$ in each operational status are determined so that the second judgment value $Y_n$ reaches the lower limit value zero in the corresponding reference supply suspension time when the second judgment value $Y_n$ is calculated as described, and that the first judgment value $X_n$ reaches the upper limit value L in the corresponding reference supply duration time when the first judgment value $X_n$ is calculated as described, on the basis of the additional value $A_n$ and the subtraction value $D_n$ in the reference operational status. The additional value $A_n$ and the subtraction value $D_n$ in each operational status, which have been obtained in the above manner, are set in the additional value map and the subtraction value map correspondingly to the urea-water supply amount and the exhaust-gas discharge amount in each operational status and the temperature of the exhaust gas into which the urea-water is supplied.

If the ECU 50 determines in Step S12 that the second judgment value $Y_n$ reaches the lower limit value zero, and carries out the procedure of Steps S14 to S16 to end the current control cycle, the ECU 50 moves the procedure from Step S1 and Step S2 in the subsequent control cycle. Since the value of the flag F is zero at this point of time, the ECU 50 advances the procedure to Step S3. In Step S3, the ECU 50 reads out the additional value $A_n$ and the subtraction value $D_n$ from the additional value map and the subtraction value map, respectively. The ECU 50 calculates the first judgment value $X_n$ in Step S4 as described before. The urea-water injection from the urea-water injector 44 is continuously permitted until it is determined in Step S5 that the first judgment value $X_n$ reaches the upper limit value L. The subsequent control is as described above.

If the SCR catalyst 40 is activated to satisfy the condition for the urea-water supply, and ammonia is required to be supplied to the SCR catalyst 40, the ECU 50 implements the urea-water supply control according to the flowchart shown in FIG. 2, so that the urea-water is intermittently injected from the urea-water injector 44 into the exhaust gas. In the intermittent urea-water supply, the urea-water supply is continued until the first judgment value $X_n$ is increased to reach the upper limit value L, and the urea-water supply is suspended until the second judgment value $Y_n$ is decreased to reach the lower limit value zero.

As described above, the upper limit value L, and the additional value $A_n$ and the subtraction value $D_n$ used for calculation of the first judgment value $X_n$ and the second judgment value $Y_n$ are set so that time that takes till the first judgment value $X_n$ is increased to the upper limit value L is equal to time that takes till the moment immediately before the solid urea starts to be accumulated when the urea-water is continuously supplied, and so that time that takes till the second judgment value $Y_n$ is decreased to the lower limit value zero is equal to time that takes till the solid urea is converted to ammonia to be annihilated during the suspension of the urea-water supply. Accordingly, even if the solid urea is formed from the urea-water injected from the urea-water injector 44 into the exhaust gas, the solid urea is successfully prevented from being accumulated in the exhaust passage formed of the upstream casing 30, the communication passage 32 and the downstream casing 34, and the urea-water injector 44. It is possible to convert the formed solid urea to ammonia and use the ammonia for the selective NOx reduction by providing the ammonia to the SCR catalyst 40.

Consequently, it is therefore possible to reliably prevent an increase in exhaust flow resistance in the upstream casing 30, the communication passage 32, and the downstream casing 34, and malfunction of the urea-water injector 44, attributable to the accumulation of the solid urea. The supply suspension time during the intermittent urea-water supply is set equal to the time before the solid urea is converted to ammonia to be annihilated during the urea-water supply suspension, so that the urea-water supply is not suspended longer than necessary. For this reason, it is possible to minimize the impact of the urea-water supply suspension upon the ammonia supply to the SCR catalyst 40. Since the intermittent urea-water supply is carried out when the SCR catalyst 40 has the activation temperature and needs to be provided with ammonia, it is not required to supply the extra urea-water to prevent the accumulation of the solid urea, and the urea-water can be efficiently used.

The additional value $A_n$ used for the calculation of the first judgment value $X_n$ is set to be increased along with the increase of the ratio of the urea-water supply amount per unit time to the exhaust-gas discharge amount from the engine 1 per unit time, and along with the decrease of the temperature of the exhaust gas into which the urea-water is supplied. If the subtraction value $D_n$ is fixed, the first judgment value $X_n$ becomes high in increasing degree and reaches the upper limit value L quickly in proportion to the increase of the ratio of the urea-water supply amount to the exhaust-gas discharge amount and the increase of the exhaust temperature. In other words, the urea-water supply duration time during the intermittent urea-water supply from the urea-water injector 44 is corrected according to the urea-water supply amount, the exhaust-gas discharge amount from the engine 1, and the exhaust temperature. As a result of this correction, the higher the ratio of the urea-water supply amount to the exhaust-gas discharge amount is, and the lower the exhaust temperature is, the shorter the supply duration time becomes. Levels of influences of the urea-water supply amount, the exhaust-gas discharge amount from the engine 1, and the exhaust temperature upon the formation of the solid urea are properly reflected in the supply duration time.

The subtraction value $D_n$ used for the calculation of the second judgment value $Y_n$ is set so as to be increased along with an increase in the exhaust-gas discharge amount from the engine 1 per unit time, and along with an increase in the temperature of the exhaust gas into which the urea water is supplied. Accordingly, as the exhaust-discharge amount is increased, and as the exhaust temperature is raised, the second judgment value $Y_n$ is increased in decreasing degree and is quickly reduced to the lower limit value zero. In other words, the urea-water supply suspension time during the intermittent urea-water supply from the urea-water injector 44 is corrected according to the exhaust-gas discharge amount from the engine 1 and the exhaust temperature. As a result of this correction, the larger the exhaust-gas discharge amount is, and the higher the exhaust temperature is, the shorter the supply suspension time becomes. Levels of influences of the exhaust-gas discharge amount from the engine 1 and the exhaust temperature upon the annihilation of the solid urea are properly reflected in the supply suspension time.

As the exhaust temperature is decreased, the solid urea is more likely to be formed from the urea-water supplied into the exhaust gas. The smaller the exhaust-gas discharge amount from the engine 1 is, and the larger the urea-water supply amount is, the more likely the solid urea is formed from the urea-water supplied into the exhaust gas. The higher the exhaust temperature is, and the larger the exhaust-gas discharge amount from the engine 1 is, the more likely the solid urea is converted to ammonia to be annihilated.

Even if the urea-water supply amount, the exhaust-gas discharge amount from the engine 1 or the exhaust temperature is changed due to a fluctuation in the operational status of the engine 1, it is possible to accurately suppress the accumulation of the solid urea by correcting the supply duration time according to the urea-water supply amount, the exhaust-gas discharge amount from the engine 1 and the exhaust temperature and by correcting the supply suspension time according to the exhaust-gas discharge amount from the engine 1 and the exhaust temperature as described above during the intermittent urea-water supply. Consequently, it is also possible to reliably prevent problems such as an increase in the exhaust flow resistance and malfunction of the urea-water injector 44.

Even if the operational status of the engine 1 is changed, the urea-water supply suspension time during the intermittent urea-water supply is corrected to be shortened as the exhaust-gas discharge amount is increased, and as the exhaust temperature is raised. Consequently, the urea-water supply suspension time during the intermittent urea-water supply is set at minimum length, so that an impact upon the ammonia supply to the SCR catalyst 40 can be minimized, and at the same time, the solid urea can be reliably converted to ammonia to be annihilated. This makes it possible to suppress a reduction in exhaust purification efficiency and successfully prevent the accumulation of the solid urea.

This is the end of the description of the exhaust purification apparatus according to the one embodiment of the invention. The invention, however, is not limited to the foregoing embodiment.

For example, according to the embodiment, the supply duration and suspension times during the intermittent urea-water supply are determined according to the first and second judgment values $X_n$ and $Y_n$ calculated using the upper limit value L, the lower limit value zero, the additional value $A_n$ and the subtraction value $D_n$. However, the supply duration and suspension times do not necessarily have to be set by this method. The supply duration and suspension times during the intermittent urea-water supply may be set directly on a map or the like so as to correspond to the urea-water supply amount per unit time, the exhaust-gas discharge amount from the engine 1 per unit time, and the exhaust temperature. In this case, the supply duration and suspension times corresponding to the actual urea-water supply amount, exhaust-gas discharge amount, and exhaust temperature are read out from the map to be set.

According to the embodiment, the supply duration and suspension times during the intermittent urea-water supply are corrected according to the urea-water supply amount per unit time, the exhaust-gas discharge amount from the engine 1 per unit time, and the exhaust temperature. Instead, the supply duration and suspension times may be corrected according to the exhaust temperature only or according to any two of the urea-water supply amount, the exhaust-gas discharge amount and the exhaust temperature. Particularly when the supply duration time is corrected according to the two factors, namely, the urea-water supply amount and the exhaust-gas discharge amount, the supply duration time is corrected according to the urea-water density within the exhaust gas because the ratio of the urea-water supply amount to the exhaust-gas discharge amount is proportional to the urea-water density as stated above.

It is also possible to use fixed values that are predetermined as the supply duration and suspension times. Although the accumulation of the solid urea can be suppressed with highest accuracy when the embodiment is applied, as the number of parameters serving as basis of the correction is decreased, a calculation load of the ECU 50 can be more reduced, and a storage capacity of a memory device for storing data for correction can be more saved. Accordingly, if the supply duration and suspension times during the intermittent urea-water supply are predetermined fixed values, the calculation load of the ECU 50 can be most reduced, and the storage capacity of the memory device for storing the data for correction can be most saved.

In the embodiment, the lower limit value used for the determination of the urea-water supply duration and suspension times is zero. However, the lower limit value is not limited to zero. The lower limit value may be properly changed depending upon how much degree of solid urea formation and how much degree of solid urea annihilation during the intermittent urea-water supply are predetermined.

In the urea-water supply control of the embodiment, during the intermittent urea-water supply, the urea-water supply is continued immediately before the solid urea starts to be accumulated due to the urea-water supply. However, the urea-water supply control may be carried out so that the urea-water supply is continued until the solid urea is accumulated by given amount. In this case, the urea-water supply suspension time is set equal to time required for the solid urea formed from the supplied urea-water, including the accumulated solid urea, to be converted to ammonia and then annihilated.

According to the embodiment, once the SCR catalyst 40 is activated, the ECU 50 determines that the condition for the urea-water supply is satisfied, and that the SCR catalyst 40 needs to be provided with ammonia. However, this is not a sole criterion for determining that the ammonia supply to the SCR catalyst 40 is necessary. For example, the determination may be made in consideration of urea-water temperature or operational statuses including the exhaust temperature, exhaust flow rate, load of the engine 1 or the like.

In the embodiment, the ECU 50 corrects the urea-water supply duration and suspension times during the intermittent urea-water supply according to the exhaust temperature detected by the exhaust temperature sensor 48 that is disposed upstream of the SCR catalyst 40. However, the exhaust temperature may be detected at another position. It is possible to choose a proper detecting position among positions in which the temperature of the exhaust gas discharged from the engine 1 can be detected.

Although the engine 1 is a four-cylinder diesel engine in the embodiment, the number of the cylinders and the type of the engine are not limited to this. The invention may be applied to any engine as long as the engine has an exhaust purification apparatus constructed to supply urea-water into exhaust gas for the purpose of providing ammonia to the SCR catalyst 40.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

This application is based on, and claims priority to, Japanese Patent Application No: 2007-270187, filed on Oct. 17, 2007. The disclosure of the priority application, in its entirety, including the drawings, claims, and the specification thereof, is incorporated herein by reference.

What is claimed is:

1. An exhaust purification apparatus for an engine comprising:
    an ammonia selective reduction NOx catalyst interposed in an exhaust passage of an engine for selectively reducing NOx contained in exhaust gas by using ammonia as a reducing agent;
    a urea-water supply device that supplies urea-water into exhaust gas existing upstream of the ammonia selective reduction-type NOx catalyst; and
    a control device includes an algorithm, the algorithm when implemented in the control device controls the urea-water supply device to supply the urea-water intermittently according to a predetermined supply duration time and a predetermined supply suspension time when the urea-water from the urea-water supply device is required for the purpose of providing ammonia to the ammonia selective reduction NOx catalyst,
    when the urea-water is supplied from the urea-water supply device, the control device controls the urea water supply device by executing the algorithm, which subsequently performs the following step calculates a first judgment value by adding an additional value corresponding to a formation amount of a solid formed from the urea-water and subtracting a subtraction value corresponding to an annihilation amount of the solid in each predetermined cycle, using a predetermined lower limit value as an initial value, determines that the supply duration time has lapsed when the first judgment value is increased up to a predetermined upper limit value, and then stops the urea-water supply from the urea-water supply device, and
    when the urea-water supply from the urea-water supply device is temporarily suspended, the control device executes the algorithm, which subsequently performs the following step calculates a second judgment value by subtracting the subtraction value in the each predetermined period, using the upper limit value as an initial value, determines that the supply suspension time has lapsed when the second judgment value is decreased to the lower limit value, and then starts the urea-water supply from the urea-water supply device.

2. The exhaust purification apparatus for an engine according to claim 1, further comprising:

an exhaust temperature detector that detects the temperature of the exhaust gas into which the urea-water is supplied from the urea-water supply device;

an exhaust-gas discharge amount detector that detects exhaust-gas discharge amount from the engine; and a target supply amount obtaining mechanism that obtains a target amount of the urea-water supplied from the urea-water supply from the engine operation state, wherein the additional value is set so as to be changed according to the exhaust temperature detected by the exhaust temperature detector, the exhaust-gas discharge amount detected by the exhaust-gas discharge amount detector, and the target amount of the urea-water obtained by the target supply amount obtaining mechanism, and wherein the subtraction value is set so as to be changed according to the exhaust temperature detected by the exhaust temperature detector and the exhaust-gas discharge amount detected by the exhaust-gas discharge amount detector.

3. The exhaust purification apparatus for an engine according to claim 2 wherein:

the additional value is set so as to be reduced along with an increase in the exhaust temperature if the exhausts-gas discharge amount and the target amount of the urea-water are fixed; the additional value is set so as to be reduced along with an increase in the exhaust-gas discharge amount if the exhaust temperature and the target amount of the urea-water are fixed; and the additional value is set so as to be reduced along with a decrease in the target amount of the urea-water if the exhaust temperature and the exhaust-gas discharge amount are fixed, and the subtraction value is set so as to be increased along with an increase in the exhaust temperature if the exhausts-gas discharge amount is fixed, and the subtraction value is set so as to be increased along with an increase in the exhaust-gas discharge amount if the exhaust temperature is fixed.

4. The exhaust purification apparatus for an engine according to claim 1, further comprising:

an exhaust temperature detector that detects the temperature of the exhaust gas into which the urea-water is supplied from the urea-water supply device, and an exhaust-gas discharge amount detector that detects exhaust-gas discharge amount from the engine, wherein the additional value is set so as to be changed according to the exhaust temperature detected by the exhaust temperature detector and urea-water density within the exhaust gas, and wherein the subtraction value is set so as to be changed according to the exhaust temperature and the exhaust-gas discharge amount detected by the exhaust-gas discharge amount detector.

5. The exhaust purification apparatus for an engine according to claim 4 wherein:

the additional value is set so as to be reduced along with an increase in the exhaust temperature if the urea-water density is fixed, and the additional value is set so as to be reduced along with a decrease in the urea-water density if the exhaust temperature is fixed, and the subtraction value is set so as to be increased along with an increase in the exhaust temperature if the exhausts-gas discharge amount is fixed, and the subtraction value is set so as to be increased along with an increase in the exhaust-gas discharge amount if the exhaust temperature is fixed.

* * * * *